United States Patent
Adavikolanu et al.

(10) Patent No.: US 10,731,480 B2
(45) Date of Patent: Aug. 4, 2020

(54) VARYING SEAL RAIL FILLET FOR TURBINE BLADES

(71) Applicant: Rolls-Royce Corporation, Indianapolis, IN (US)

(72) Inventors: Sivaram Surya Sanyasi Adavikolanu, Bengaluru (IN); Gayathri Puram, Bengaluru (IN)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 190 days.

(21) Appl. No.: 15/921,070

(22) Filed: Mar. 14, 2018

(65) Prior Publication Data

US 2018/0266256 A1 Sep. 20, 2018

(30) Foreign Application Priority Data

Mar. 17, 2017 (IN) .............................. 201711009279

(51) Int. Cl.
*F01D 5/22* (2006.01)
*F01D 11/08* (2006.01)

(52) U.S. Cl.
CPC .............. *F01D 5/225* (2013.01); *F01D 11/08* (2013.01); *F05D 2220/32* (2013.01); *F05D 2250/712* (2013.01); *F05D 2250/90* (2013.01)

(58) Field of Classification Search
CPC . F01D 5/225; F01D 5/20; F01D 11/08; F01D 5/22; F04D 2220/32; F05D 2250/712; F05D 2250/90
See application file for complete search history.

(56) References Cited

U.S. PATENT DOCUMENTS

| | | | |
|---|---|---|---|
| 6,241,471 B1 * | 6/2001 | Herron | F01D 5/147 415/173.1 |
| 6,832,897 B2 * | 12/2004 | Urban | F01D 5/225 416/223 A |
| 7,001,152 B2 | 2/2006 | Paquet et al. | |
| 7,686,568 B2 * | 3/2010 | Moors | F01D 5/225 415/1 |
| 7,762,779 B2 * | 7/2010 | Zemitis | F01D 5/225 415/173.4 |
| 8,317,465 B2 * | 11/2012 | Smith | F01D 5/225 415/173.6 |
| 8,807,928 B2 | 8/2014 | Kareff et al. | |
| 9,388,701 B2 * | 7/2016 | Kuwamura | F01D 5/225 |

(Continued)

FOREIGN PATENT DOCUMENTS

FR 2977909 B1 * 7/2016

*Primary Examiner* — Richard A Edgar
*Assistant Examiner* — Joshua R Beebe
(74) *Attorney, Agent, or Firm* — Brinks Gilson & Lione

(57) ABSTRACT

A turbine blade assembly may be provided for use in a gas turbine engine. The turbine blade assembly may include an airfoil and a tip shroud. The airfoil may extend radially outward from an axis of rotation of the airfoil. The tip shroud may be located at a radial end of the airfoil. The tip shroud may include a seal rail that extends in a direction of rotation of the airfoil. A notch, including a Z-notch or a V-notch, may be situated on a first side of the seal rail at an end of the seal rail. A variable fillet may be situated on a second side of the seal rail that is opposite of the first side on which the notch is situated. The variable fillet is a fillet having a curvature that varies along a length of the second side.

20 Claims, 6 Drawing Sheets

(56) References Cited

U.S. PATENT DOCUMENTS

| | | | | |
|---|---|---|---|---|
| 9,903,210 B2* | 2/2018 | Evans | ..................... | F01D 5/225 |
| 2005/0106025 A1* | 5/2005 | Snook | ..................... | F01D 5/141 |
| | | | | 416/189 |
| 2016/0237829 A1* | 8/2016 | Kozdras | ..................... | F01D 5/20 |
| 2018/0230817 A1* | 8/2018 | Rollings | ................. | B23P 6/002 |

* cited by examiner

VARYING SEAL RAIL FILLET FOR TURBINE BLADES

This application claims priority under 35 USC § 119 to Indian patent application 201711009279 filed Mar. 17, 2017, the entire contents of which are hereby incorporated by reference.

TECHNICAL FIELD

This disclosure relates to gas turbine engines and, in particular, to tip shrouds of turbine blades.

BACKGROUND

Gas turbine engines may be used as a means for propulsion in any aircraft, such as a jet or a helicopter, or in any other vehicle. Operating a gas turbine engine may subject various components of the gas turbine engine, including tip shrouds of turbine blades, to thermal and mechanical stresses.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

By way of an introductory example, a turbine blade assembly may be provided for use in a gas turbine engine. The turbine blade assembly may include an airfoil and a tip shroud. The airfoil may extend radially outward from an axis of rotation of the airfoil. The tip shroud may be located at a radial end of the airfoil. The tip shroud may include a seal rail that extends in a direction of rotation of the airfoil. A notch (a Z-notch or a V-notch) may be situated on a first side of the seal rail at an end of the seal rail. For example, the notch may be situated on a first side of the seal rail at a leading or trailing end of the seal rail (with respect to the direction of rotation of the airfoil). The notch may be, for example, an indentation or a recess along the end of the tip shroud that allows for the interlocking of tip shrouds on adjacent turbine blade assemblies. A variable fillet may be situated on a second side of the seal rail that is opposite of the first side on which the notch is situated. The variable fillet is a fillet having a curvature that varies along a length of the second side.

One interesting feature of the systems and methods described below may be that the variable fillet, in some examples, increases an area of contact between tip shrouds of adjacent turbine blades of the gas turbine engine. An increase in the contact area may, for example, decrease interface wear, reduce shingling, and increase tip damping. Alternatively, or in addition, an interesting feature of the systems and methods described below may be, in some examples, an increase in local stiffness of the tip shroud, resulting in a reduction of bending stress on the tip shroud. Compared to other solutions, adding the variable fillet may not substantially increase the mass of the tip shroud.

Figure 1:
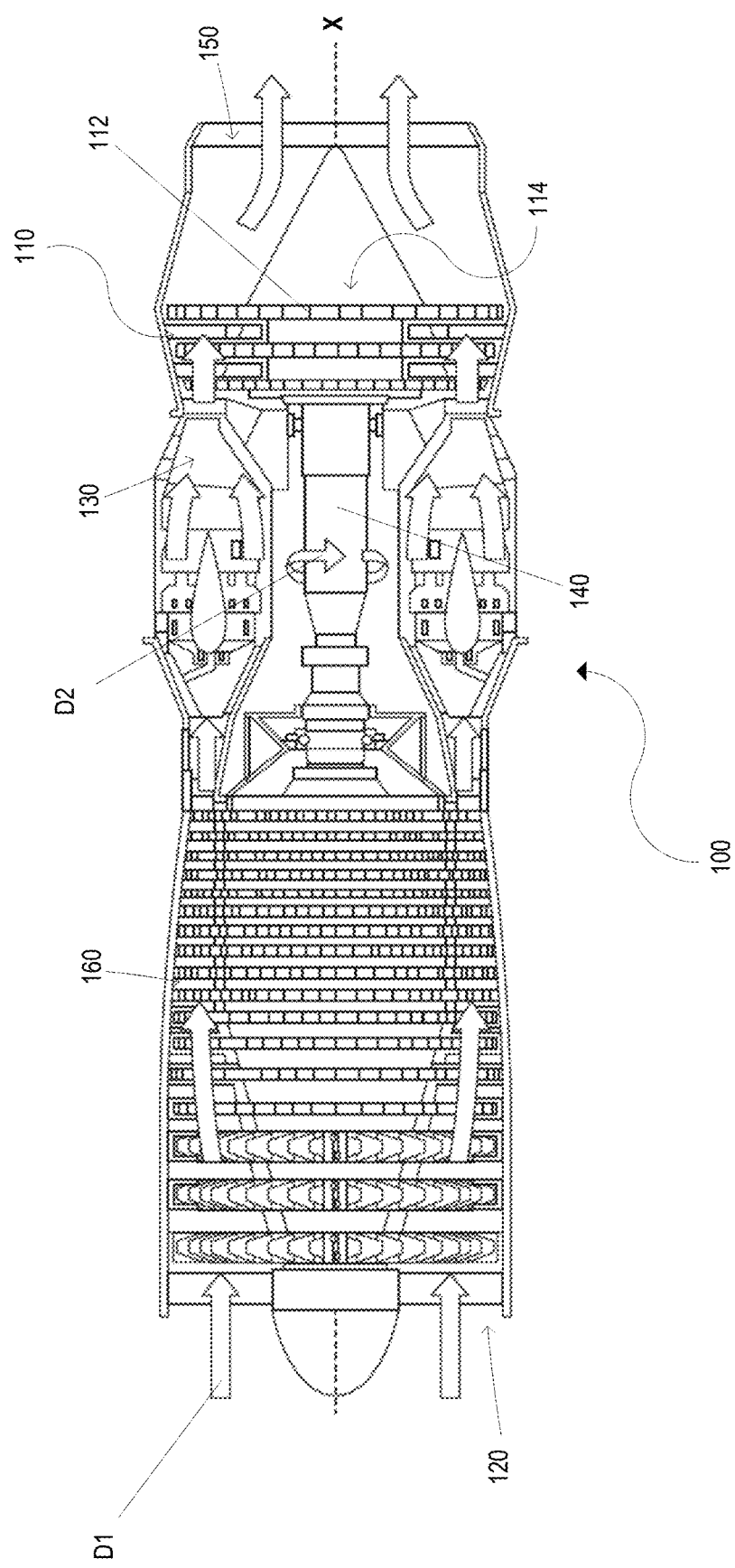
FIG. 1 is a cross-sectional view of an example of a gas turbine engine system.

FIG. 1 is a cross-sectional view of a gas turbine engine 100 for propulsion of, for example, an aircraft. Alternatively or in addition, the gas turbine engine 100 may be used to drive a propeller in aquatic applications, or to drive a generator in energy applications. The gas turbine engine 100 may include an intake section 120, a compressor section 160, a combustion section 130, a turbine section 110, and an exhaust section 150. During operation of the gas turbine engine 100, fluid received from the intake section 120, such as air, travels along the direction D1 and may be compressed within the compressor section 160. The compressed fluid may then be mixed with fuel and the mixture may be burned in the combustion section 130. The combustion section 130 may include any suitable fuel injection and combustion mechanisms. The hot, high pressure fluid may then pass through the turbine section 110 to extract energy from the fluid and cause a turbine shaft of a turbine 114 in the turbine section 110 to rotate, which in turn drives the compressor section 160. Discharge fluid may exit the exhaust section 150.

As noted above, the hot, high pressure fluid passes through the turbine section 110 during operation of the gas turbine engine 100. As the fluid flows through the turbine section 110, the fluid passes between adjacent blades 112 of the turbine 114 causing the turbine 114 to rotate. The rotating turbine 114 may turn a shaft 140 in a rotational direction D2, for example. The blades 112 may rotate around an axis of rotation, which may correspond to a centerline X of the turbine 114 in some examples.

Figure 2:
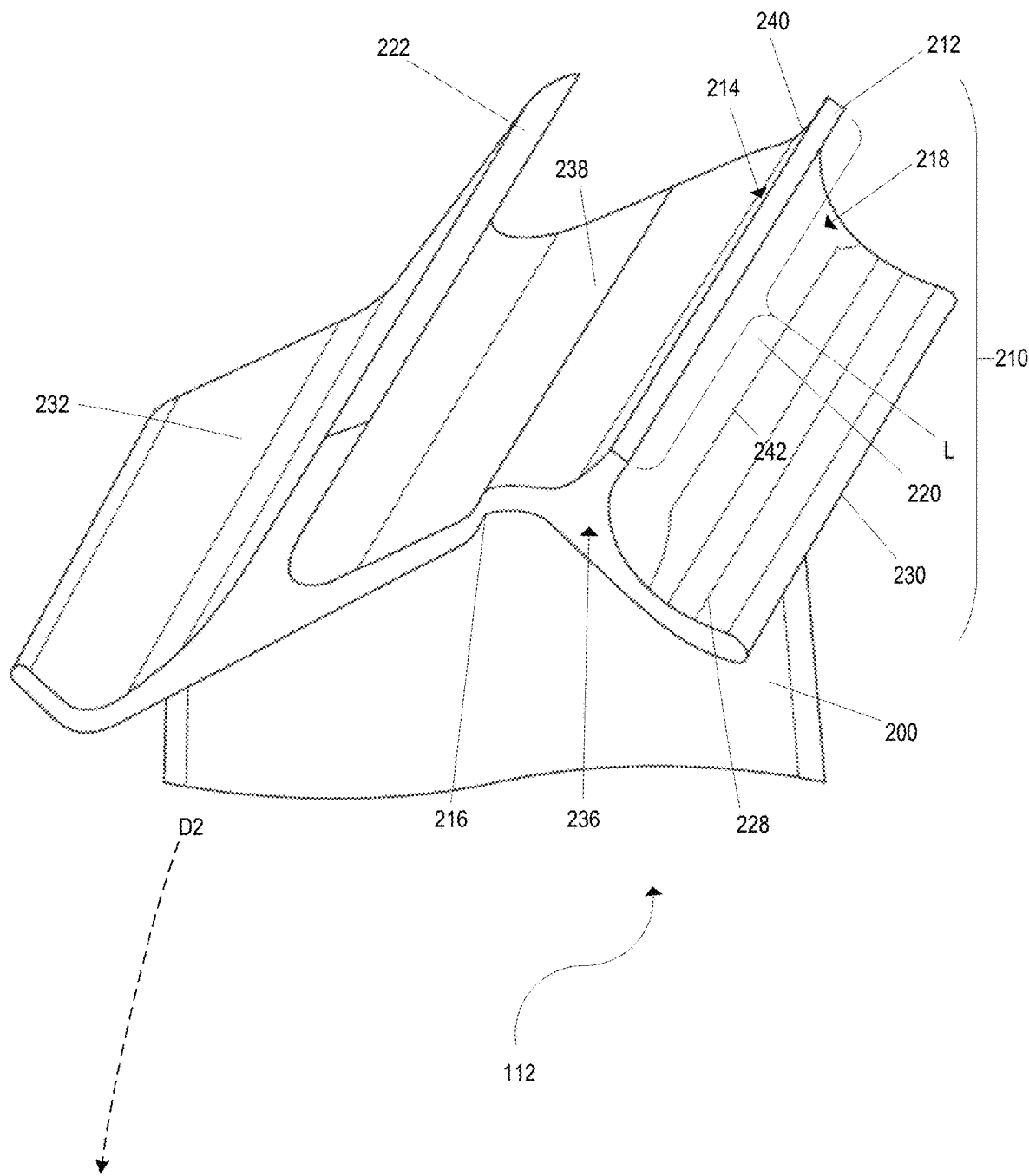
FIG. 2 is a perspective view of an example of a tip shroud with a variable fillet.

FIG. 2 illustrates an example of a blade assembly for a respective one of the blades 112. The blade assembly for the respective one of the blades 112 includes a tip shroud 210 and an airfoil 200. The tip shroud 210 may include, for example, a seal rail 212, a notch 216, a fillet 220, a radially outward facing surface 238, an aft section 232, and a fore section 228 that extends to an outer edge 230 of the tip shroud 210. As noted above, during operation of the gas turbine engine 100, fluid may pass between adjacent blades 112, and more specifically, fluid may pass between the airfoils 200 of adjacent blades 112, causing the blades 112 to rotate in the rotational direction D2 in some examples or in a direction opposite of the rotational direction D2 in other examples.

The tip shroud 210 may be a component attached to or integral with a respective one of the airfoils 200 that limits fluid flow over a tip of the blade 112 so that the fluid instead flows around the airfoil 200. In some examples, the tip shroud 210 may be a mechanical damping device configured to reduce vibration of the blades 112 by acting as a frictional dampener. Examples of the tip shroud 210 may include one or more surfaces integrally or removably attached to the respective one of the airfoils 200. The tip shroud 210 may include the seal rail 212 and may include one or more notches, such as the notch 216 shown in FIG. 2.

The seal rail 212 may be a protrusion from the radially outward facing surface 238 of the tip shroud 210. Any radially outward portion of the tip shroud 210 may be considered at the top of the tip shroud 210. The seal rail 212 may extend along a length L of the tip shroud 210. The length L that the seal rail 212 extends along may be all or a part of the entire distance from a first end 236 of the tip shroud 210 to a second end 240 of the tip shroud 210, where the first end 236 and the second end 240 are configured to come into contact with adjacent tip shrouds (not shown in FIG. 2) of adjacent turbine blades. The seal rail 212 may be of any desired shape, size, or configuration, such as a rail having a wedge-shaped or substantially triangular-shaped cross-section. The second seal rail 222 may be configured to interface with a seal segment or blade track (not shown) in order to limit or block, for example, fluid flow between the tip shroud 210 and the seal segment or blade track (not shown) during operation of the gas turbine engine 100.

The seal rail 212 may have a first side 214 and a second side 218, where the second side 218 is opposite of the first side 214. The first side 214 may, in some examples, include the notch 216. The notch 216 may be an area of the tip shroud 212 that, during operation of the gas turbine engine 100, exhibits concentrations of mechanical stress. A profile of the tip shroud 210 may be in the shape a "Z" (as the profile is in FIGS. 2-4 and 6) or in the shape of a "V" (not shown). The notch 216 in the "Z" or the "V" may be referred to as a Z-notch or a V-notch, respectively. The shape of the notch 216 may allow for improved longevity and performance of the tip shroud 210 by reducing overall stresses on the tip shroud 210. The notch 216 may be, for example, an indentation or a carved-out recess. Alternatively, the notch 216 may not include any indentation or recess. Alternatively or in addition, the notch 216 may be an area of the tip shroud 210 that facilitates the blade 112 interlocking with adjacent blades (not shown in FIG. 2). The notch 216 may be located along the first end 236 of the tip shroud 210.

The second side 218 may include a fillet 220 that is a variable fillet at the first end 236 of the tip shroud 210. The fillet 220 may have a concave face. The fillet 220 may be of a variety of shapes such as semi-circular, semi-elliptical, or semi-oblong, for example. In some examples, the fillet 220 may be able to withstand ambient temperatures of up to 2400° F., or higher. The tip shroud 210 may be made of any suitable material such as, for example, a metal alloy or a ceramic matrix composite. The radius of curvature of the fillet 220 may vary along the length L of the seal rail 212. In some examples, the curvature of the fillet 220 may have a larger radius at or near the first end 236 and/or the second end 240 of the tip shroud 210 than another portion of the fillet 220, such as a middle portion 242 of the fillet 220. In some examples, the fillet 220 may have abrupt changes in the radius from the first end 236 to the second end 240, while in other examples, the change in radius of the fillet 220 may occur gradually over a relatively long or short distance from the first end 236 to the second end 240.

In the example shown in FIG. 2, the notch 216 and variable fillet 220 are opposite of each other at the first end 236 of the tip shroud 210. Alternatively or in addition, the notch 216 and variable fillet 220 may be opposite of each other at the second end 240 of the tip shroud 210. For example, the notch 216 may be on the first side 214 at the second end 240 of the tip shroud 210, and the variable fillet 220 may on the second side 218 at the second end 240 of the tip shroud 210.

In the example shown in FIG. 2, the notch 216 is on the first side 214 and the variable fillet 220 is on the second side 218. However, in some examples, the sides on which the notch 216 and the variable fillet 220 are located may be reversed. For example, the notch 216 may be on the second side 218 and the variable fillet 220 may be on the first side 214 opposite of the notch 216 at the first end 236 of the tip shroud 210. Alternatively or in addition, the notch 216 may be on the second side 218 and the variable fillet 220 may be on the first side 214 opposite of the notch 216 at the second end 240 of the tip shroud 210. In some examples, a first notch is on one side 214, 218 of the seal rail 212 at one end 236, 240 of the tip shroud 210 and a first variable fillet is opposite of the notch on the other side 214, 218 at that one end 236, 240 of the tip shroud 210; and a second notch is on the other side 214, 218 of the seal rail 212 at the other end 236, 240 of the tip shroud 210 and a second variable fillet is on the opposite side of the second notch at the other end 236, 240 of the tip shroud 210.

The tip shroud 212 may include a fore section 228 that is adjacent to the fillet 220. The fore section 228 may have changes in its curvature from the fillet 220 to the outer edge 230 along the tip shroud 212 in a direction that is traverse to the rotational direction D2 of the seal rail 212. In some examples, the fore section 228 extends from the first end 236 to the second end 240 of the tip shroud 210. The fore section 228 may have a constant or variable radius along a length from the first end 236 to the second end 240. In some examples, the fore section 228 are flat segments, while in other examples, the fore section 228 may be curved. Alternatively, in some examples, the fore section 228 may not be present on the tip shroud 210 or the fore section 228 may have a different shape than illustrated in FIG. 2.

In some examples, the tip shroud 210 may include two or more seal rails. For example, a second seal rail 222 is shown in FIG. 2. The second seal rail 222 may further limit fluid flow over the tip of the tip shroud 210. The second seal rail 222 protrudes from the radially outward facing surface 238 of the tip shroud 210. The second seal rail 222 may be of any desired shape, size, or configuration, such as a rail having a wedge-shaped or spire-shaped cross-section. The second seal rail 222 may be configured to interface with a seal segment or blade track (not shown) in order to, for example, further limit fluid flow between the tip shroud 210 and the seal segment or blade track (not shown) during operation of the gas turbine engine 100. The second seal rail 222 may or may not include the variable fillet 220 and/or the notch 216. In the example shown in FIG. 2, the second seal rail 222 does not include the variable fillet 220 or the notch 216.

In some examples, the tip shroud 210 includes the aft section 232. The aft section 232 may provide annulus definition for the hot gases.

Figure 3:
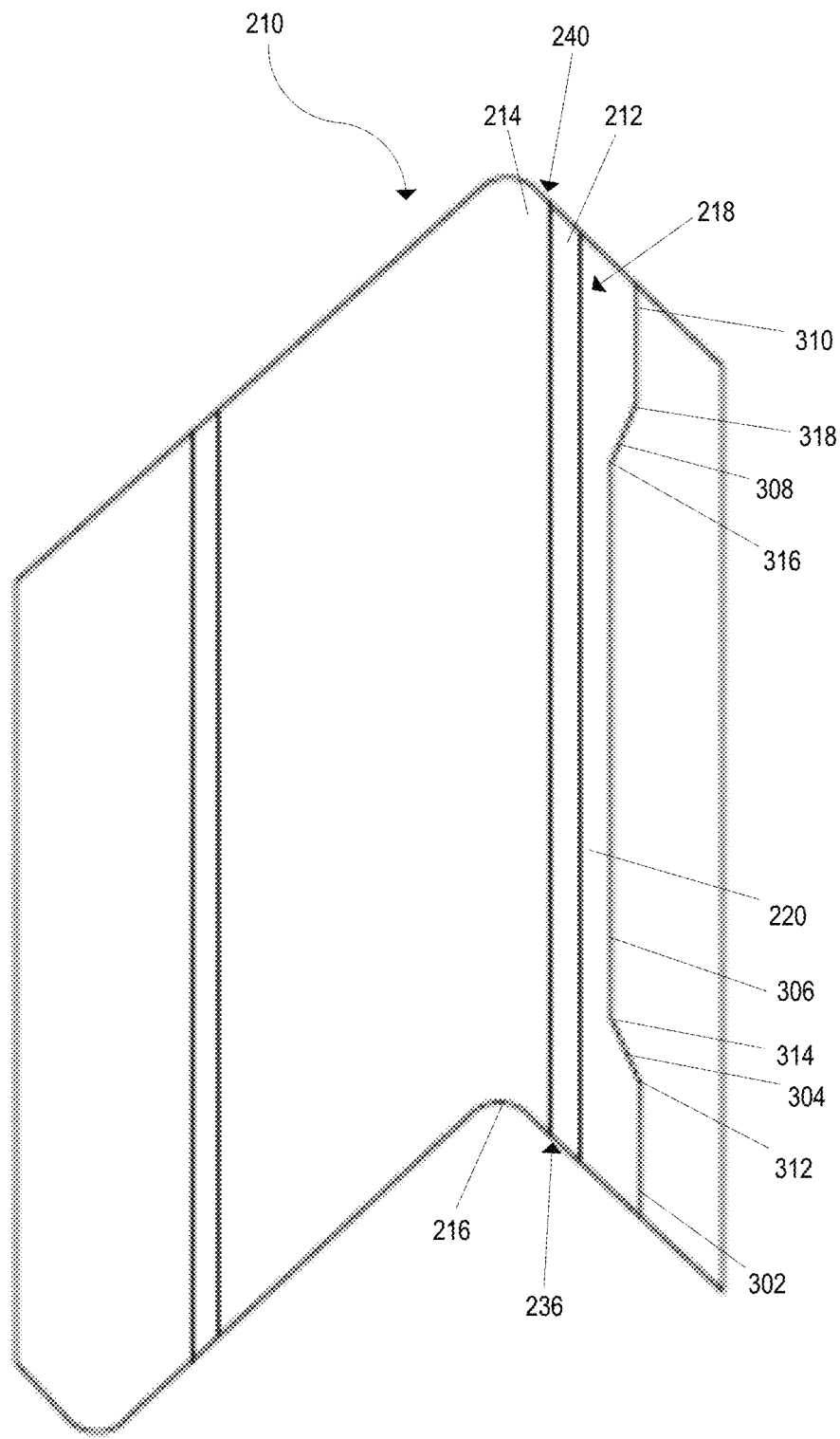
FIG. 3 is a top view of an example tip shroud with a variable fillet, the variable fillet having at least two constant radii, namely an end portion having a first radius of curvature and a middle portion having a second radius of curvature.

FIG. 3 illustrates a top view of an example of the tip shroud 210. In the example illustrated in FIG. 3, the fillet 220 has five portions 302, 304, 306, 308, and 310 between the first end 236 and the second end 240 of the tip shroud 210. The first portion 302 starts at the first end 236 and extends to meet a second portion 304 at a first transition 312. The second portion 304 is between the first portion 302 and a third portion 306. The second portion 304 extends from the first transition 312 to a second transition 314. The third portion 306 may be a middle portion that extends, for example, 70 to 80 percent of the length of the seal rail 212. The third portion 306 is between the second portion 304 and a fourth portion 308. The third portion 306 extends from the second transition 314 to a third transition 316. The fourth portion 308 is between the third portion 306 and a fifth portion 310. The fourth portion 308 extends from a third transition 316 to a fourth transition 318. The fifth portion is between the fourth portion 308 and the second end 240 of the tip shroud 210. The fifth portion extends from the fourth transition 318 to the second end 240 of the tip shroud 210.

In some examples, such as the example shown in FIG. 3, the first portion 302, the third portion 306, and the fifth portion 310 each has a constant or substantially constant radius. In some examples, the radius of curvature the first portion 302 is larger than the radius of curvature of the third portion 306. Alternatively or in addition, in some examples, the radius of curvature of the fifth portion 310 is larger than the radius of curvature of the third portion 306. The radius of curvatures of the first portion 302 and the fifth portion 310 radius may be substantially the same in some examples and different in other examples. In some examples, the second portion 304 may have a radius of curvature that is the same as the radius of curvature of the first portion 302 at the first transition 312. In addition, the second portion 304 may have a radius of curvature that is the same as the radius of curvature of the third portion 306 at the second transition 314. The radius of curvature of the second portion 304 may vary between the first transition 312 and the second transition 314. The variation of the radius of curvature of the second portion 304 may be continuous from the first transition 312 to the second transition 314. The second portion 304 may be as short as desired, even non-existent in some examples. Similarly, the radius of curvature of the fourth portion 308 may be the same as the radius of curvature of the third portion 306 at the third transition 316. In addition, the radius of curvature of the fourth portion 308 may be the same as the radius of curvature of the fifth portion 310 at the forth transition 318. The radius of curvature of the forth portion 308 may vary between the third transition 316 and the fourth transition 318. The variation of the radius of curvature of the fourth portion 308 may be continuous from the third transition 316 to the fourth transition 318. In some examples, the first portion 302, the second portion 304, the third portion 306, the fourth portion 308, and the fifth portion 310 may vary in shape.

The first transition 312, the second transition 314, the third transition 316, and fourth transition 318 are parts of the fillet 220 at the boundaries between the first portion 302, the second portion 304, the third portion 306, the fourth portion 308, and the fifth portion 310, respectively, along the fillet 220. Any or all of the first transition 312, the second transition 314, the third transition 316, and the fourth transition 318 may be any shape.

Figure 4:
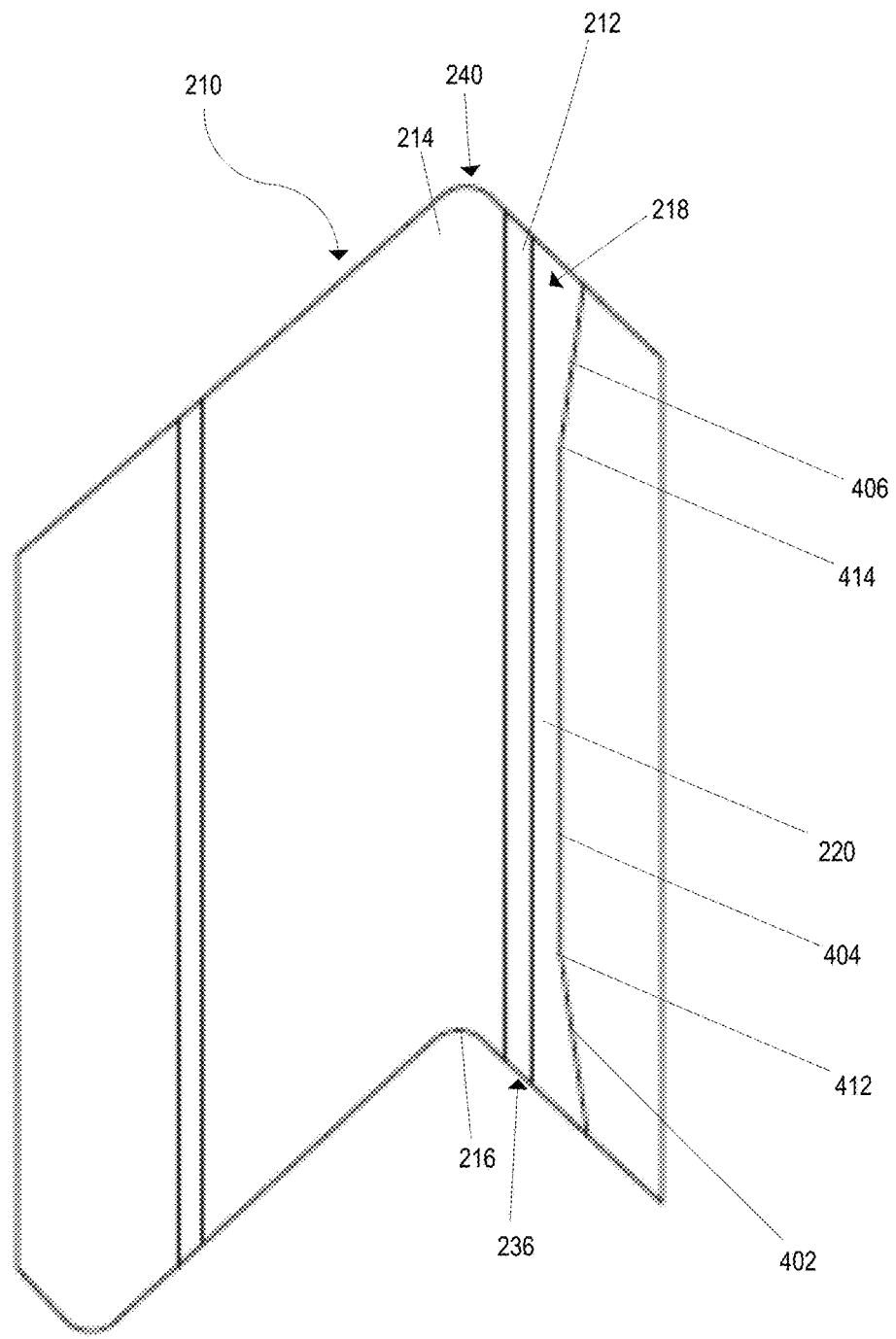
FIG. 4 illustrates a top view of an example tip shroud with a variable fillet, the radius of the variable fillet continuously increasing from a middle portion to an end of the variable fillet.

FIG. 4 illustrates a top view of an example of the tip shroud 210 in which the fillet 220 has three portions 402, 404, and 406 between the first end 236 to the second end 240 of the tip shroud 210. A first portion 402 may be between the first end 236 and a second portion 404. The first portion 402 may extend from the first end 236 to a first transition 412. The second portion 404 may be between the first portion 402 and a third portion 406. The second portion 404 extends from the first transition 412 to a second transition 414. A third portion 406 may be between the second portion 404 and the second end 240 of the tip shroud 210. The third portion 406 may extend from the second transition 414 and to the second end 240.

The second portion 404 may have a constant or substantially constant radius of curvature. In some examples, the radius of the first portion 402 continuously increases from the first transition 412 to the first end 236. Alternatively or in addition, the radius of curvature of the third portion 406 may continuously increase from the second transition 414 to the second end 240 of the tip shroud 210.

The first transition 412 and the second transition 414 are parts of the fillet 220 at the boundaries between the first portion 402 and the second portion 404, and between the second portion 404 and the third portion 406, respectively. The first transition 412 and the second transition 414 may be any suitable shape.

Figure 5:
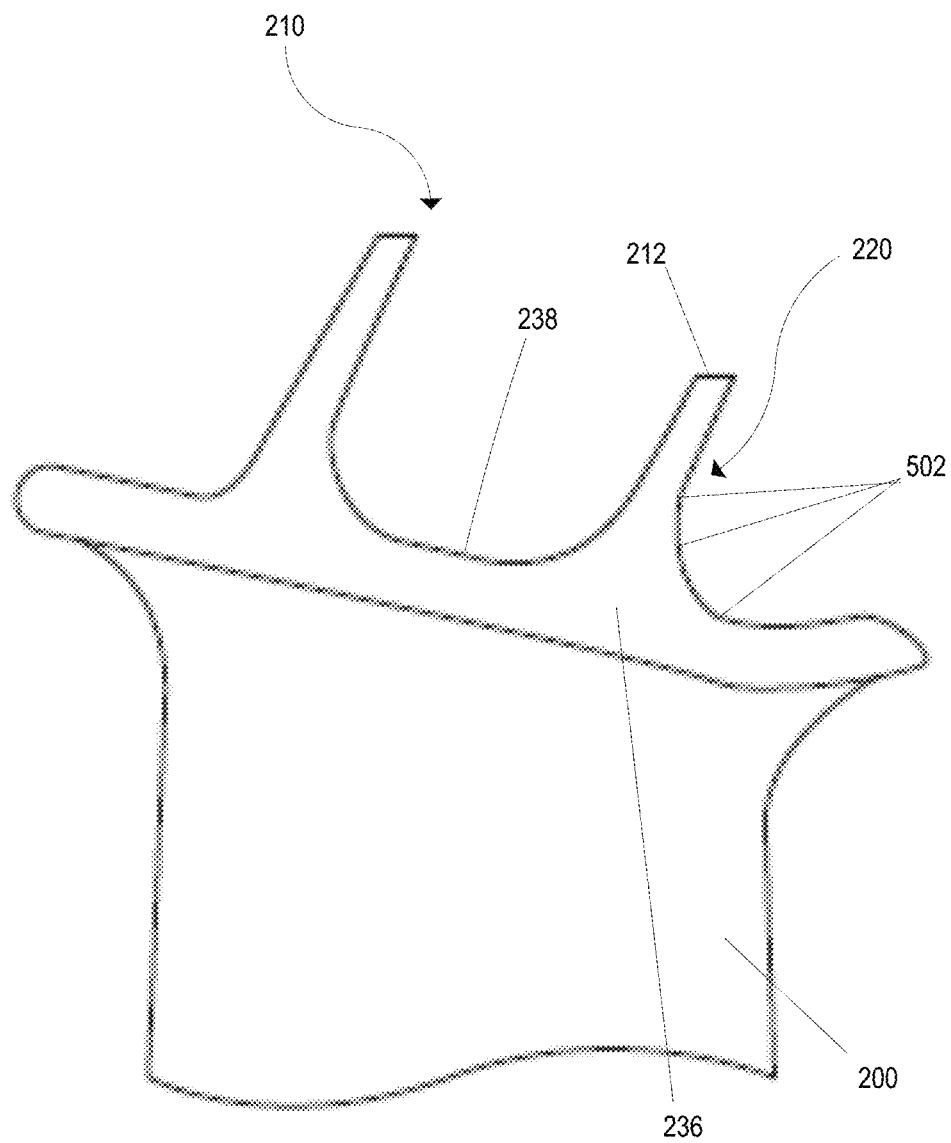
FIG. 5 illustrates a side view of an example tip shroud with a variable fillet that is contoured.

FIG. 5 is a side view example of the tip shroud 210 on an airfoil 200. FIG. 5 shows an example of fillet 220 having one or more contoured sections 502. The contoured sections 502 show changes in the radius of curvature of the fillet 220 moving in a direction that is perpendicular to the seal rail 212.

The contoured sections 502 may represent changes in the curvature of the fillet 220 along a direction that is traverse to the rotational direction D2 of the seal rail 212. In some examples, the contoured sections 502 extend from the first end 236 to the second end 240 of the tip shroud 210. The contoured sections 502 may have a constant or variable radius from the first end 236 to the second end 240. In some examples, the contoured sections 502 are flat segments, while in other examples, the contoured sections 502 may be curved. Alternatively, in some examples, the contoured sections 502 may not be present on the tip shroud 210.

Figure 6:
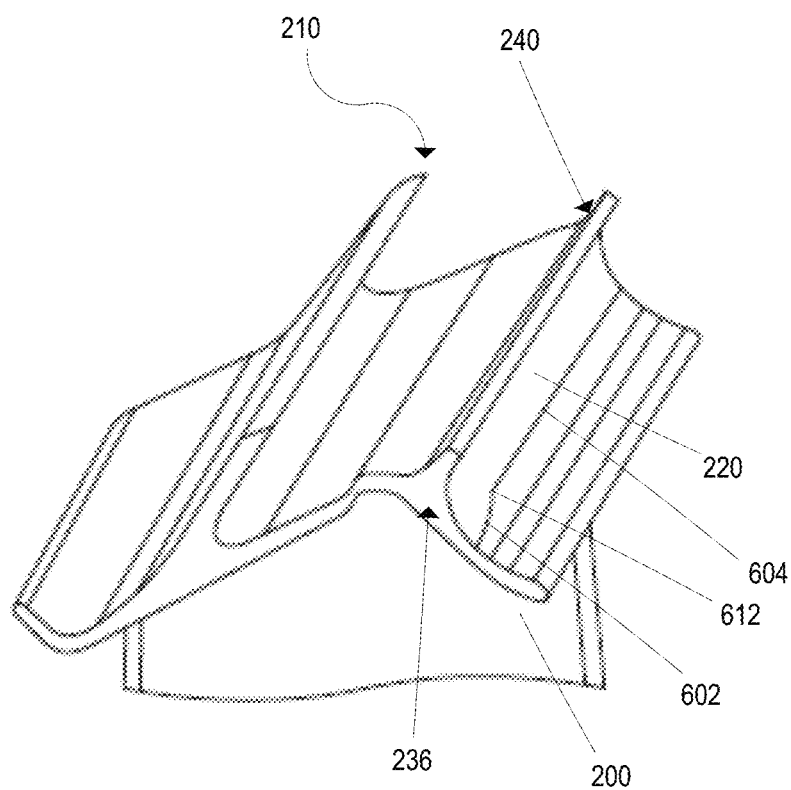
FIG. 6 illustrates an example of a tip shroud with a variable fillet with multiple radii at only one end of the fillet.

FIG. 6 is a perspective view of an example of the tip shroud 210 on the airfoil 200. FIG. 6 shows the fillet 220 being a variable fillet only at the first end 236. In some examples, such as the example illustrated in FIG. 6, the fillet 220 comprises two portions, which together may extend from the first end 236 to the second end 240 of the tip shroud 210. In some examples, a first portion 602 may start at the first end 236 and extend to meet a second portion 604 at a transition 612.

In some examples, the second portion 604 has a constant or a substantially constant radius. In some examples, the first portion 602 radius continuously increases from the first transition 612 to the first end 236.

The transition 612 is a part of the fillet 220 at the boundary between the first portion 602 and the second portion 604 along the fillet 220. The transition 612 may be any suitable shape.

Each component may include additional, different, or fewer components. For example the number of seal rails may vary. FIGS. 2-6 show two seal rails 212 and 222, however, the tip shroud 210 may have more or fewer seal rails than those shown in FIGS. 2-6.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

1. A tip shroud for use in a gas turbine engine, the tip shroud comprising:
    a seal rail located at a top of the tip shroud;
    a notch located on a first side of the seal rail at an end of the seal rail, and
    a variable fillet located on a second side of the seal rail at the end of the seal rail, the second side opposite of the first side on which the notch is located, wherein the variable fillet is a fillet that has a non-constant curvature along a length of the second side.
2. The tip shroud of aspect 1, wherein the variable fillet comprises a first portion, a second portion, and a third portion along the length of the second side, wherein the first portion is at the end of the seal rail and the second portion is between the first portion and the third portion, wherein the first portion has a curvature of a first constant radius and the third portion has a curvature of a second constant radius, wherein a curvature of the second portion has the first constant radius at a transition from the second portion to the first portion and a curvature of the second radius at a transition from the second portion to the third portion.
3. The tip shroud of any of aspects 1 to 2, wherein the variable fillet comprises a first portion and a second portion along the length of the second side, the first portion is at the end of the seal rail, a curvature of the second portion has a constant radius, a curvature of the first portion has the constant radius at a transition from the first portion to the second portion, and the curvature of the first portion continuously increases from the transition to the end of the seal rail on the second side of the seal rail.
4. The tip shroud of any of aspects 1 to 3, wherein the variable fillet has a radius that is contoured at the end of the seal rail.
5. The tip shroud of any of aspects 1 to 4, wherein a curvature of the variable fillet at the end of the seal rail has at least two radii.
6. The tip shroud of any of aspects 1 to 5, wherein the seal rail is a first seal rail, the tip shroud further comprising a second seal rail.
7. The tip shroud of aspect6, wherein the variable fillet is a first variable fillet, and the non-constant curvature along the length of the second side of the first variable fillet is a first non-constant curvature, the second seal rail having a second variable fillet, wherein the second variable fillet has a second non-constant curvature.
8. The tip shroud of aspect 1, wherein the end of the tip shroud is a first end, the tip shroud further comprises a second end that is opposite of the first end, the variable fillet comprises a first portion, a second portion, a third portion, a fourth portion, and a fifth portion along a length of the second side;
    wherein the first portion is at the first end of the seal rail and the second portion is between the first portion and the third portion, the first portion having a curvature of a first radius and the third portion having a curvature of a second radius, wherein a curvature of the second portion has the first radius at a first transition from the second portion to the first portion and a curvature of the second radius at a second transition from the second portion to the third portion; and
    wherein the fifth portion is at the second end of the seal rail and the fourth portion is between the third portion and the fifth portion, the fifth portion having a curvature of a third radius, wherein a curvature of the fourth portion has the third constant radius at a third transition between the fourth portion and the fifth portion and a curvature of the second radius at a fourth transition between the fourth portion and the third portion.
9. The tip shroud of aspect 1, wherein the end of the tip shroud is a first end, the tip shroud further comprising a second end, the variable fillet comprising a first portion, a second portion, and a third portion, along the length of the second side; a curvature of the second portion has a constant radius; the first portion is at the first end of the seal rail; a curvature of the first portion has the constant radius towards the second portion, and the curvature of the first portion continuously increases towards the first end of the seal rail; the third portion is at the second end of the seal rail; and a curvature of the third portion has the constant radius towards the second portion, and the curvature of the third portion continuously increases towards the second end of the seal rail.
10. A turbine blade assembly for use in a gas turbine engine, the turbine blade assembly comprising:
    an airfoil extending radially outward from an axis of rotation of the airfoil;
    a tip shroud situated at a radial end of the airfoil, the tip shroud comprising a seal rail that extends in a direction of rotation of the airfoil;
    a notch, including a Z-notch or a V-notch, situated on a first side of the seal rail at an end of the seal rail; and
    a variable fillet situated on a second side of the seal rail, the second side opposite of the first side on which the notch is situated, wherein the variable fillet is a fillet having a curvature that varies along a length of the second side.
11. The turbine blade assembly of aspect 10, wherein the variable fillet comprises a first portion, a second portion, and a third portion along the length of the second side, wherein the first portion is at the end of the seal rail and the second portion is between the first portion and the third portion, wherein the first portion has a curvature of a first constant radius and the third portion has a curvature of a second constant radius, wherein a curvature of the second portion has the first constant radius at a transition from the second portion to the first portion and a curvature of the second radius at a transition from the second portion to the third portion.
12. The turbine blade assembly of aspect 10, wherein the variable fillet comprises a first portion and a second portion along the length of the second side, the first portion at the end of the seal rail, a curvature of the second portion having a constant radius and a curvature of the first portion having the constant radius towards the second portion and the curvature of the first portion continuously increases towards the end of the seal rail on the second side of the seal rail.
13. The turbine blade assembly of any of aspects 10 to 12, wherein the variable fillet has a radius that is contoured at the end of the seal rail.
14. The turbine blade assembly of any of aspects 10 to 13, wherein the curvature of the variable fillet at the end of the seal rail has at least two radii.
15. The turbine blade assembly of any of aspects 10 to 14, wherein the seal rail is a first seal rail, the tip shroud further comprising a second seal rail.
16. The turbine blade assembly of aspect 15, wherein the variable fillet is a first variable fillet and the curvature is a first curvature, the second seal rail having a second variable fillet having a second curvature that varies along a length of the second seal rail.
17. The turbine blade assembly of aspect 10, wherein the end of the tip shroud is a first end, the tip shroud further comprises a second end that is opposite of the first end, the variable fillet comprising a first portion, a second portion, a third portion, a fourth portion, and a fifth portion along the length of the second side;

wherein the first portion is at the first end of the seal rail and the second portion is between the first portion and the third portion, the first portion has a curvature of a first radius and the third portion has a curvature of a second radius, wherein a curvature of the second portion has the first radius at a first transition from the second portion to the first portion and a curvature of the second radius at a second transition from the second portion to the third portion;

wherein the fifth portion is at the second end of the seal rail and the fourth portion is between the third portion and the fifth portion, the fifth portion having a curvature of a third radius, wherein a curvature of the fourth portion has the third radius at a third transition between the fourth portion and the fifth portion and a curvature of the second radius at a fourth transition between the fourth portion and the third portion.

18. The turbine blade assembly of aspect 17, wherein first radius is the same as the third radius.

19. The turbine blade assembly of aspect 10, wherein the end of the tip shroud is a first end, the tip shroud further comprising a second end, the variable fillet comprising a first portion, a second portion, and a third portion along the length of the second side; a curvature of the second portion has a constant radius; the first portion is at the first end of the seal rail; a curvature of the first portion has the constant radius towards the second portion, and the curvature of the first portion continuously increases towards the first end of the seal rail; the third portion is at the second end of the seal rail; and a curvature of the third portion has the constant radius towards the second portion, and the curvature of the third portion continuously increases towards the second end of the seal rail.

20. A turbine blade assembly comprising:
   an airfoil; and
   a tip shroud at an end of the airfoil that is radially outward from an axis of rotation of the airfoil,
   the tip shroud comprising:
      a seal rail extending beyond a radially outward surface of the tip shroud, the seal rail extending a length from a first end of the tip shroud to a second end of the tip shroud, the second end opposite of the first end, the first end and the second end each configured to contact a respective adjacent blade assembly; and
      a variable fillet situated on one side of the seal rail, wherein the one side of the seal rail faces in a direction that is perpendicular to a line that extends from the first end to the second end of the seal rail, wherein a curvature of the variable fillet varies along the length of the one side of the seal rail, the variable fillet comprising a first portion, a second portion, a third portion, a fourth portion, and a fifth portion arranged in the order listed along the length of the second side,
      wherein the first portion is at the first end of the seal rail and the fifth portion is at the second end of the seal rail, the first portion has a curvature of a first constant radius, the third portion has a curvature of a second constant radius, the fifth portion has a curvature of a third constant radius, wherein a curvature of the second portion has the first constant radius towards the first portion and a curvature of the second radius towards the third portion, and
      wherein a curvature of the fourth portion has the third constant radius towards the fifth portion and a curvature of the second radius towards the third portion.

What is claimed is:

1. A tip shroud for use in a gas turbine engine, the tip shroud comprising:
   a seal rail located at a top of the tip shroud;
   a notch located on a first side of the seal rail at an end of the seal rail, the notch including a Z-notch or a V-notch; and
   a variable fillet located on a second side of the seal rail at the end of the seal rail, the second side opposite of the first side on which the notch is located, wherein the variable fillet is a fillet that has a non-constant curvature along a length of the second side, wherein a radius of the non-constant curvature of the fillet is larger at the end of the seal rail than at any other portion of the fillet.

2. The tip shroud of claim 1, wherein the variable fillet comprises a first portion, a second portion, and a third portion along the length of the second side, wherein the first portion is at the end of the seal rail and the second portion is between the first portion and the third portion, wherein the first portion has a curvature of a first constant radius and the third portion has a curvature of a second constant radius, wherein a curvature of the second portion has the first constant radius at a transition from the second portion to the first portion and a curvature of the second radius at a transition from the second portion to the third portion.

3. The tip shroud of claim 1, wherein the variable fillet comprises a first portion and a second portion along the length of the second side, the first portion is at the end of the seal rail, a curvature of the second portion has a constant radius, a curvature of the first portion has the constant radius at a transition from the first portion to the second portion, and the curvature of the first portion continuously increases from the transition to the end of the seal rail on the second side of the seal rail.

4. The tip shroud of claim 1, wherein the radius of the variable fillet is contoured at the end of the seal rail.

5. The tip shroud of claim 1, wherein a curvature of the variable fillet at the end of the seal rail has at least two radii.

6. The tip shroud of claim 1, wherein the seal rail is a first seal rail, the tip shroud further comprising a second seal rail.

7. The tip shroud of claim 6, wherein the variable fillet is a first variable fillet, and the non-constant curvature along the length of the second side of the first variable fillet is a first non-constant curvature, the second seal rail having a second variable fillet, wherein the second variable fillet has a second non-constant curvature.

8. The tip shroud of claim 1, wherein the end of the tip shroud is a first end, the tip shroud further comprises a second end that is opposite of the first end, the variable fillet comprises a first portion, a second portion, a third portion, a fourth portion, and a fifth portion along a length of the second side;
   wherein the first portion is at the first end of the seal rail and the second portion is between the first portion and the third portion, the first portion having a curvature of a first radius and the third portion having a curvature of a second radius, wherein a curvature of the second portion has the first radius at a first transition from the second portion to the first portion and a curvature of the second radius at a second transition from the second portion to the third portion; and
   wherein the fifth portion is at the second end of the seal rail and the fourth portion is between the third portion and the fifth portion, the fifth portion having a curvature of a third radius, wherein a curvature of the fourth portion has the third constant radius at a third transition between the fourth portion and the fifth portion and a curvature of the second radius at a fourth transition between the fourth portion and the third portion.

9. The tip shroud of claim 1, wherein the end of the tip shroud is a first end, the tip shroud further comprising a second end, the variable fillet comprising a first portion, a second portion, and a third portion, along the length of the second side;
a curvature of the second portion has a constant radius;
the first portion is at the first end of the seal rail; a curvature of the first portion has the constant radius towards the second portion, and the curvature of the first portion continuously increases towards the first end of the seal rail;
the third portion is at the second end of the seal rail; and a curvature of the third portion has the constant radius towards the second portion, and the curvature of the third portion continuously increases towards the second end of the seal rail.

10. A turbine blade assembly for use in a gas turbine engine, the turbine blade assembly comprising:
an airfoil extending radially outward from an axis of rotation of the airfoil;
a tip shroud situated at a radial end of the airfoil, the tip shroud comprising a seal rail that extends in a direction of rotation of the airfoil;
a notch, including a Z-notch or a V-notch, situated on a first side of the seal rail at an end of the seal rail; and
a variable fillet situated on a second side of the seal rail, the second side opposite of the first side on which the notch is situated, wherein the variable fillet is a fillet having a curvature that varies along a length of the second side, wherein a radius of the curvature of the fillet is larger at the end of the seal rail than at any other portion of the fillet.

11. The turbine blade assembly of claim 10, wherein the variable fillet comprises a first portion, a second portion, and a third portion along the length of the second side, wherein the first portion is at the end of the seal rail and the second portion is between the first portion and the third portion, wherein the first portion has a curvature of a first constant radius and the third portion has a curvature of a second constant radius, wherein a curvature of the second portion has the first constant radius at a transition from the second portion to the first portion and a curvature of the second radius at a transition from the second portion to the third portion.

12. The turbine blade assembly of claim 10, wherein the variable fillet comprises a first portion and a second portion along the length of the second side, the first portion at the end of the seal rail, a curvature of the second portion having a constant radius and a curvature of the first portion having the constant radius towards the second portion and the curvature of the first portion continuously increases towards the end of the seal rail on the second side of the seal rail.

13. The turbine blade assembly of claim 10, wherein the radius of the variable fillet is contoured at the end of the seal rail.

14. The turbine blade assembly of claim 10, wherein the curvature of the variable fillet at the end of the seal rail has at least two radii.

15. The turbine blade assembly of claim 10, wherein the seal rail is a first seal rail, the tip shroud further comprising a second seal rail.

16. The turbine blade assembly of claim 15, wherein the variable fillet is a first variable fillet and the curvature is a first curvature, the second seal rail having a second variable fillet having a second curvature that varies along a length of the second seal rail.

17. The turbine blade assembly of claim 10, wherein the end of the tip shroud is a first end, the tip shroud further comprises a second end that is opposite of the first end, the variable fillet comprising a first portion, a second portion, a third portion, a fourth portion, and a fifth portion along the length of the second side;
wherein the first portion is at the first end of the seal rail and the second portion is between the first portion and the third portion, the first portion has a curvature of a first radius and the third portion has a curvature of a second radius, wherein a curvature of the second portion has the first radius at a first transition from the second portion to the first portion and a curvature of the second radius at a second transition from the second portion to the third portion;
wherein the fifth portion is at the second end of the seal rail and the fourth portion is between the third portion and the fifth portion, the fifth portion having a curvature of a third radius, wherein a curvature of the fourth portion has the third radius at a third transition between the fourth portion and the fifth portion and a curvature of the second radius at a fourth transition between the fourth portion and the third portion.

18. The turbine blade assembly of claim 17, wherein first radius is the same as the third radius.

19. The turbine blade assembly of claim 10, wherein the end of the tip shroud is a first end, the tip shroud further comprising a second end, the variable fillet comprising a first portion, a second portion, and a third portion along the length of the second side; a curvature of the second portion has a constant radius; the first portion is at the first end of the seal rail; a curvature of the first portion has the constant radius towards the second portion, and the curvature of the first portion continuously increases towards the first end of the seal rail; the third portion is at the second end of the seal rail; and a curvature of the third portion has the constant radius towards the second portion, and the curvature of the third portion continuously increases towards the second end of the seal rail.

20. A turbine blade assembly comprising:
an airfoil; and
a tip shroud at an end of the airfoil that is radially outward from an axis of rotation of the airfoil,
the tip shroud comprising:
a seal rail extending beyond a radially outward surface of the tip shroud, the seal rail extending a length from a first end of the (tip) to a second end of the (tip), the second end opposite of the first end, the first end and the second end each configured to contact a respective adjacent blade assembly;
a notch, including a Z-notch or a V-notch, situated on a first side of the seal rail at the first end of the seal rail; and
a variable fillet situated on a second side of the seal rail, the second side opposite of the first side on which the notch is situated, wherein the second side of the seal rail faces in a direction that is perpendicular to a line that extends from the first end to the second end of the seal rail, wherein a curvature of the variable fillet varies along the length of the one side of the seal rail, the variable fillet comprising a first portion, a second portion, a third portion, a fourth portion, and a fifth portion arranged in the order listed along the length of the second side, wherein the first portion is at the first end of the seal rail and the fifth portion is at the second end of the seal rail, the first portion has a curvature of a first constant radius, the third portion has a curvature of a second constant radius, the fifth portion has a curvature of a third constant radius, wherein a curvature of the second portion has the first constant radius towards the first portion and a curvature of the second radius towards the third portion, and wherein a curvature of the fourth portion has the third constant radius towards the fifth portion and a curvature of the second radius towards the third portion, wherein the first constant radius of the first portion is larger than the second constant radius of the third portion.

* * * * *